W. E. MILLER.
MULTIPLE WEDGE.
APPLICATION FILED SEPT. 26, 1914.
1,198,745.
Patented Sept. 19, 1916.
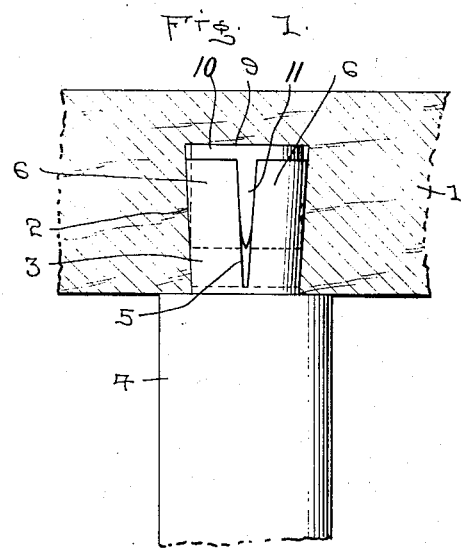
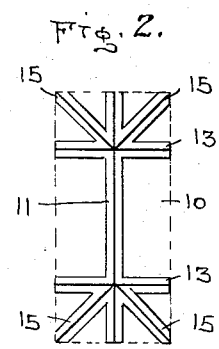
Witnesses
Thos. W. Riley
J. H. Reid.
Inventor
W. E. Miller
By W. J. Fitzgerald & Co
Attorney

UNITED STATES PATENT OFFICE.

WILLIAM EARL MILLER, OF LANSING, MICHIGAN.

MULTIPLE WEDGE.

1,198,745.   Specification of Letters Patent.   Patented Sept. 19, 1916.

Application filed September 26, 1914. Serial No. 863,647.

*To all whom it may concern:*

Be it known that I, WILLIAM EARL MILLER, a citizen of the United States, residing at Lansing, in the county of Ingham and State of Michigan, have invented certain new and useful Improvements in Multiple Wedges; and I do hereby declare the following to be a full, clear, and exact description of the invention, such as will enable others skilled in the art to which it appertains to make and use the same.

This invention relates to multiple wedges, and has for one of its objects the provision of a multiple wedge for use in connection with joinery for efficiently retaining the tenon or tongue of one member within the socket or mortise of the other.

A further object of this invention resides in the provision of a multiple wedge having wedging members disposed in angular relation to each other whereby to efficiently force portions of the tenon or tongue into the remote corners and edges of the respective socket or mortise.

These and other objects will more fully appear, and the nature of the invention more clearly understood by the construction, combination and arrangement of the parts thereof, as described in the following specification, defined in the appended claim and illustrated in the accompanying drawings, in which, Figure 1 is a fractional view of two members, partly shown in section, showing the same as joined together and the manner of applying the wedge in retaining the tenon or tongue of one of the members within the socket or mortise of the other. Fig. 2 is a bottom plan view of the wedge, showing the wedging members disposed at different degrees of angular relation to each other.

I deem it expedient to here state that while the application of the wedge is shown in Fig. 1 of the drawings is shown as applied to a joint comprising a round tenon and corresponding socket, that this is merely shown for the sake of clearness and convenience. However, the multiple wedge constituting this invention is equally adapted for use in connection with joints comprising tenons or tongues and sockets or mortises of any desired formation used in any of the arts where joints are necessary, such as the manufacture of furniture, wheelwrighting, or for securing the handles of any tool therein, and the members to be joined together may be formed of wood, metal or other suitable material.

Referring to Fig. 1 of the drawings, 1 denotes one of the members to be joined together, and which is provided with the approximately frusto-conical socket or bore 2, into which socket 2 is seated the tenon 3 of the other member 4 to be joined. The tenon 3 of the member 4 is designed to be sawed or otherwise slitted longitudinally to provide a plurality of wedge slots 5, the wedge slots 5 bisecting each other, in the transverse direction of the tenon or tongue 3 to provide a plurality of wedging fins 6, and within the wedge slots 5, is designed to project the multiple wedge 11 for forcing apart the fins 6 of tenon 3 for impinging the exterior surfaces of the fins 6 against the wall of the socket 2, the multiple wedge 11 being provided with a head 10, if desired, which head 10 lies between the base 9 of the socket 2 and the ends of the fins 6 of the tenon 3 upon the completion of the joint. This wedge may be provided with the head 10, if desired, or the same may be efficiently used without the head 10, however, I reserve the right to manufacture both constructions in order to meet all of the demands or desires of the public. In the construction of the wedge, the same is provided with longitudinal wedging member 11, the transverse wedging members 13, and the oblique wedging members 15.

The wedge shown in Fig. 2 is primarily designed for use in connection with joints comprising tongues and mortises, the mortises being constructed with divergent walls, the tongues being sawed or slitted to provide wedge slots to correspond with the character of the wedging members of the wedge used, and the manner of completing the joint being a similar operation as above described relative to Fig. 1. However, particular attention is directed to the oblique wedging members 15 as shown in Fig. 2, these wedging members being designed to force apart the triangular fins formed at the corners of the tongue employed in this instance for attaining a most efficient wedging action at the corners within the mortise of the other member to be joined.

Having thus made clear the construction and use of my invention, what I claim and desire to secure by Letters Patent, is:

A wedge for securing tenons in mortises, comprising a flat rectangular head having an elongated longitudinally and centrally disposed wedging member upon its under surfaces and extending from end to end upon said head, a plurality of transverse members disposed upon the under surfaces of said head and intersecting said elongated longitudinally and centrally disposed wedging member at right angles thereto and extending to the side edges of said head, the ends of said elongated longitudinally and centrally disposed wedging member projecting for a distance beyond the outer sides of the adjacent transverse members, and a plurality of obliquely disposed wedging members upon the under surfaces of said head and radiating from the intersections of said elongated longitudinally and centrally disposed wedging member and said transverse wedging members and extending to the corners of said head, all of said wedging members being of a uniform depth and having their sharp edges lying in a plane with each other.

In testimony whereof I have signed my name to this specification in the presence of two subscribing witnesses.

WILLIAM EARL MILLER.

Witnesses:
EDITH A. THOMPSON,
LUCILE G. HUNTOON.